(12) United States Patent
Kalyanaraman et al.

(10) Patent No.: US 8,445,398 B2
(45) Date of Patent: May 21, 2013

(54) ION EXCHANGE PROCESS FOR MAKING MOLECULAR SIEVE COMPOSITION

(75) Inventors: Mohan Kalyanaraman, Media, PA (US); Darryl D. Lacy, Easton, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 279 days.

(21) Appl. No.: 12/166,090

(22) Filed: Jul. 1, 2008

(65) Prior Publication Data

US 2009/0036295 A1 Feb. 5, 2009

Related U.S. Application Data

(60) Provisional application No. 60/952,987, filed on Jul. 31, 2007.

(51) Int. Cl.
| | |
|---|---|
| B01J 21/00 | (2006.01) |
| B01J 29/00 | (2006.01) |
| B01J 29/04 | (2006.01) |
| C10G 11/02 | (2006.01) |
| C10G 11/04 | (2006.01) |

(52) U.S. Cl.
USPC .................... 502/74; 502/85; 208/118

(58) Field of Classification Search
USPC ....................................... 502/75, 86
See application file for complete search history.

(56) References Cited

U.S. PATENT DOCUMENTS

| | | | |
|---|---|---|---|
| 2,882,243 A | 4/1959 | Milton | |
| 2,882,244 A | 4/1959 | Milton | |
| 3,130,007 A | 4/1964 | Breck | |
| 3,247,195 A | 4/1966 | Kerr | |
| 3,314,752 A | 4/1967 | Kerr | |
| 3,375,065 A * | 3/1968 | McDaniel et al. | 423/275 |
| 3,528,768 A | 9/1970 | Tucker | |
| 3,702,886 A | 11/1972 | Argauer et al. | |
| 3,709,979 A | 1/1973 | Chu | |
| 3,832,449 A | 8/1974 | Rosinski et al. | |
| 3,875,290 A * | 4/1975 | Gring | 423/700 |
| 3,972,983 A | 8/1976 | Ciric | |
| 4,016,245 A | 4/1977 | Plank et al. | |
| 4,076,842 A | 2/1978 | Plank et al. | |
| 4,346,067 A * | 8/1982 | Wachter | 423/326 |
| 4,382,023 A * | 5/1983 | Mulaskey | 502/79 |
| 4,645,750 A * | 2/1987 | Best | 502/26 |
| 4,809,780 A * | 3/1989 | Shen | 166/272.1 |
| 4,837,398 A * | 6/1989 | Chang et al. | 502/86 |
| 4,954,325 A | 9/1990 | Rubin et al. | |
| 4,981,663 A | 1/1991 | Rubin | |
| 5,057,472 A | 10/1991 | Hertzengerg et al. | |
| 5,063,187 A * | 11/1991 | Burgfels et al. | 502/71 |
| 5,475,182 A * | 12/1995 | Janssen | 585/640 |
| 6,124,228 A | 9/2000 | Wu et al. | |
| 7,220,395 B2 * | 5/2007 | Cooper et al. | 423/235 |
| 2002/0072468 A1 * | 6/2002 | Seff et al. | 502/73 |
| 2005/0010074 A1 * | 1/2005 | Iwayama et al. | 585/481 |

FOREIGN PATENT DOCUMENTS

| | | | |
|---|---|---|---|
| CN | 1743069 | * | 3/2006 |
| CN | 1743069 A | * | 3/2008 |
| WO | WO2007/003737 | | 11/2007 |

OTHER PUBLICATIONS

Perry, R.H., Perry's Chemical Engineers' Handbook, 1997, McGraw Hill (7th Edition), Table 2-2, Record No. 1302.*
Perry, R.H., Perry's Chemical Engineers' Handbook, 1997, McGraw Hill (7th Edition) Table 2-1, Record No. 392.*
BASF(Ammonium Carbamate Crystals Product Description, http://www.inorganics.basf.com/p02/CAPortal/en_GB/portal/Stickstoffprodukte/content/Produktgruppen/Stickstoffprodukte/Produktinformationen/Ammoniumcarbamat_Kristalle).*

* cited by examiner

*Primary Examiner* — Emily Le
*Assistant Examiner* — Michael Forrest
(74) *Attorney, Agent, or Firm* — Darryl M. Tyus

(57) ABSTRACT

This disclosure relates to a process for preparing a catalyst composition comprising (a) contacting a molecular sieve composition with a solution of a solvent and a solute under ion-exchange conditions to form an exchanged molecular sieve composition, wherein the solute comprises at least one of an amide compound, an imide compound, a strong proton donor, or any combination thereof, the solute has a solubility in the solvent of at least 0.05 g per 100 grams of the solvent, preferably at least 1 gram per 100 grams of the solvent; and (b) separating the exchanged molecular sieve from the mixture of the step (a).

8 Claims, No Drawings

ION EXCHANGE PROCESS FOR MAKING MOLECULAR SIEVE COMPOSITION

CROSS REFERENCE TO RELATED APPLICATION

This application claims priority to U.S. Provisional Patent Application No. 60/952,987 filed Jul. 31, 2007, which is hereby incorporated by reference.

FIELD OF THE INVENTION

The present disclosure relates to a novel ion exchange process for making molecular sieve composition.

BACKGROUND OF THE INVENTION

Molecular sieve materials, both natural and synthetic, have been demonstrated in the past to have catalytic properties for various types of hydrocarbon conversion. Molecular sieves that find application in catalysis include any of the naturally occurring or synthetic crystalline molecular sieves. Examples of these zeolites include large pore zeolites, intermediate pore size zeolites, and small pore zeolites. These zeolites and their isotypes are described in "Atlas of Zeolite Framework Types", eds. W. H. Meier, D. H. Olson and Ch. Baerlocher, Elsevier, Fifth Edition, 2001, which is hereby incorporated by reference. A large pore zeolite generally has a pore size of at least about 7 Å and includes LTL, VFI, MAZ, FAU, OFF, *BEA, and MOR framework type zeolites (IUPAC Commission of Zeolite Nomenclature). Examples of large pore zeolites include mazzite, offretite, zeolite L, VPI-5, zeolite Y, zeolite X, omega, and Beta. An intermediate pore size zeolite generally has a pore size from about 5 Å to less than about 7 Å and includes, for example, MFI, MEL, EUO, MTT, MFS, AEL, AFO, HEU, FER, MWW, and TON framework type zeolites (IUPAC Commission of Zeolite Nomenclature). Examples of intermediate pore size zeolites include ZSM-5, ZSM-11, ZSM-22, MCM-22, silicalite 1, and silicalite 2. A small pore size zeolite has a pore size from about 3 Å to less than about 5.0 Å and includes, for example, CHA, ERI, KFI, LEV, SOD, and LTA framework type zeolites (IUPAC Commission of Zeolite Nomenclature). Examples of small pore zeolites include ZK-4, ZSM-2, SAPO-34, SAPO-35, ZK-14, SAPO-42, ZK-21, ZK-22, ZK-5, ZK-20, zeolite A, chabazite, zeolite T, gmelinite, ALPO-17, and clinoptilolite.

Such molecular sieves, both natural and synthetic, include a wide variety of positive ion-containing crystalline molecular sieves, such as crystalline silicates. These silicates can be described as a rigid three-dimensional framework of $SiO_4$ and Periodic Table Group 13 element oxide, e.g., $AlO_4$, in which the tetrahedra are cross-linked by the sharing of oxygen atoms whereby the ratio of the total Group 13 element, e.g., aluminum, and silicon atoms to oxygen atoms is 1:2. The electrovalence of the tetrahedra containing the Group 13 element, e.g., aluminum, is balanced by the inclusion in the crystal of a cation, for example an alkali metal or an alkaline earth metal cation. This can be expressed wherein the ratio of the Group 13 element, e.g., aluminum, to the number of various cations, such as $Ca^{2+}/2$, $Sr^{2+}/2$, $Na^+$, $K^+$ or $Li^+$, is equal to unity. One type of cation may be exchanged either entirely or partially with another type of cation utilizing ion exchange techniques in a conventional manner. By means of such cation exchange, it has been possible to vary the properties of a given silicate by suitable selection of the cation.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

A summary of the prior art, in terms of production, modification and characterization of molecular sieves, is described in the book "Molecular Sieves—Principles of Synthesis and Identification"; (R. Szostak, Blackie Academic & Professional, London, 1998, Second Edition). In addition to molecular sieves, amorphous materials, chiefly silica, aluminum silicate and aluminum oxide, have been used as adsorbents and catalyst supports. A number of long-known techniques, like spray drying, prilling, pelletizing and extrusion, have been and are being used to produce macrostructures in the form of, for example, spherical particles, extrudates, pellets and tablets of both microporous and other types of porous materials for use in catalysis, adsorption and ion exchange. A summary of these techniques is described in "Catalyst Manufacture," A. B. Stiles and T. A. Koch, Marcel Dekker, New York, 1995.

Numerous methods have been developed to increase the activity of catalysts. Molecular sieve acid activity can be increased by various means such as mild steaming, hydrothermal treatment in the presence of aluminum, and vapor phase treatment with aluminum chloride. Various chemical treatments of molecular sieves have been proposed to modify their chemical properties and increase catalyst activity. U.S. Pat. No. 6,124,228 teaches a standard method of increasing catalyst activity by performing an ion exchange with an ammonium salt followed by calcination. The activated or acidified form of the molecular sieve is often referred to as the H-form molecular sieve or the proton form of the molecular sieve.

Many as-synthesized molecular sieves contain cations, such as, sodium and/or potassium, which are chemically bonded to the molecular sieve framework. In addition, the as-synthesized molecular sieve may comprise salt, such as, sodium hydroxide, which is chemically bonded to the molecular sieve framework. Conventionally, the as-synthesized molecular sieve is converted to its proton form that normally exhibits catalytic acidity for acid catalyzed reactions by ammonium ion exchange of the as-synthesized molecular sieve with an ammonium salt, e.g., ammonium nitrate, ammonium sulfate, or ammonium chloride, to form an ammonium-form ($NH_4$-form) molecular sieve. The ammonium-form molecular sieve is then calcined in $N_2$ and/or air at a suitable temperature to decompose ammonium to ammonia and proton, which forms the proton-form molecular sieve. The conventional ammonium ion exchange process generates a waste stream containing nitrate, sulfate, or chloride. There is, therefore, a need for a novel and environmentally friendly process of making ammonium-form molecular sieve.

SUMMARY OF THE INVENTION

In some embodiments, this disclosure relates to a process for preparing a catalyst composition comprising:
(a) contacting a molecular sieve composition with a solution of a solvent and a solute under ion-exchange conditions to form an exchanged molecular sieve composition, wherein the solute comprises at least one of an amide compound, an imide compound, a strong proton donor, or any combination thereof, the solute has a solubility in the solvent of at least 0.05 g per 100 grams of the solvent, preferably at least 1 g per 100 grams of the solvent; and (b) separating the exchanged molecular sieve from the mixture of the step (a).

In other embodiments, this disclosure relates to a process for manufacturing a catalyst composition comprising:

(a) extruding at least one molecular sieve with at least one binder to form an extrudate;

(b) calcining the extrudate with $N_2$ and/or air at a temperature ranging from 20° C. to 700° C.;

(c) contacting the calcined extrudate from step (b) with a solution of a solvent and a solute under ion-exchange conditions to form an exchanged extrudate, wherein the solute comprises at least one of an amide compound, an imide compound, a strong proton donor, or any combination thereof, the solute has a solubility in the solvent of at least 0.05 g per 100 grams of the solvent;

(d) separating the exchanged extrudate from the mixture of the step (c); and (e) contacting the exchanged extrudate with $N_2$ and/or air at a temperature ranging from 20° C. to 700° C. to form the catalyst composition.

In yet other embodiments, this disclosure relates to a process for hydrocarbon conversion comprising the steps of:

(a) contacting a hydrocarbon with a catalyst composition made by a process of this disclosure under hydrocarbon conversion conditions to form a converted product; and (b) withdrawing the converted product.

In some aspect of this disclosure, the molecular sieve has a Constraint Index of less than or equal to 12. Examples of a molecular sieve having a Constraint Index of less than or equal to 12 are zeolite X, zeolite Y, zeolite beta, TS-1, TS-2, ETS-10, ETAS-10, ETGS-10, MCM-22, MCM-36, MCM-41, MCM-48, MCM-49, MCM-50, MCM-56, MCM-65, MCM-71, EMM-10, EMM-10P, ZSM-5, ZSM-11, ZSM-12, ZSM-18, ZSM-22, ZSM-23, ZSM-35, ZSM-39, ZSM-48, ZSM-50, ZSM-57, ZSM-58, Mordenite, Faujasite, zeolite L, ferrierite, SAPO-11, SAPO-17, SAPO-18, SAPO-34, SAPO-44.

In some preferred embodiments, the solvent comprises at least one of water, alcohol, or DMSO.

Preferably, the strong proton donor comprises at least one of nitric acid, hydrochloric acid, sulfuric acid, acetic acid, oxalic acid, or carbonic acid.

Preferably, the amide compound comprises at least one of carbamide, alkyl carbamate, carbamic acid, or cyanamide. More preferably, the amide compound comprises urea, ammonium carbamate, and ammonium formate.

In some aspect of this disclosure, the ion-exchange conditions have a temperature ranging from 0° C. to 250° C., a pressure ranging from 10 kPa-a to 1000 kPa-a, a pH ranging from about 0 to 14, and a molar ratio of cation exchange capacity of the molecular sieve composition over cation per charge of the solute range from 0.005 to 200.

These and other facets of the present invention shall become apparent from the following detailed description and appended claims.

DETAILED DESCRIPTION OF THE INVENTION

In some embodiments, this disclosure relates to a process for preparing a catalyst composition comprising:

(a) contacting a molecular sieve composition with a solution of a solvent and a solute under ion-exchange conditions to form an exchanged molecular sieve composition, wherein the solute comprises at least one of an amide compound, an imide compound, a strong proton donor, or any combination thereof, the solute has a solubility in the solvent of at least 0.05 g per 100 grams of the solvent, preferably at least 1 g per 100 grams of the solvent; and (b) separating the exchanged molecular sieve from the mixture of the step (a).

As used in this specification, the term "framework type" is used in the sense described in the "Atlas of Zeolite Framework Types," 2001.

As used herein, the numbering scheme for the Periodic Table Groups is used as in Chemical and Engineering News, 63(5), 27 (1985).

In some aspect of this disclosure, the molecular sieve has a Constraint Index of less than or equal to 12. Alternatively, the molecular sieve useful for this disclosure has a Constraint Index of less than or equal to 2.

The constraint index is a convenient measure of the extent to which an aluminosilicate or molecular sieve provides controlled access to molecules of varying sizes to its internal structure. For example, aluminosilicates which provide a highly restricted access to and egress from its internal structure have a high value for the constraint index, and aluminosilicates of this kind usually have pores of small size, e.g. less than 5 Angstroms. On the other hand, aluminosilicates which provide relatively free access to the internal aluminosilicate structure have a low value for the constraint index, and usually pores of large size. The method by which constraint index is determined is described fully in U.S. Pat. No. 4,016,218, which is incorporated herein by reference for the details of the method.

When the molecular sieve produced is a crystalline metallosilicate, the chemical formula of such an anhydrous crystalline metallosilicate can be expressed in terms of moles as represented by the formula: $M_{2/n}O:W_2O_3:ZSiO_2$, wherein M is selected from the group consisting of hydrogen, hydrogen precursors, monovalent, divalent, and trivalent cations and mixtures thereof, n is the valence of the cation and Z is a number of at least 2, preferably at least 3, said value being dependent upon the particular type of molecular sieve, and W is a metal in the anionic framework structure of the molecular sieve such as aluminum, gallium, boron, or iron.

The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395.

Examples of a molecular sieve having a Constraint Index of less than or equal to 12 are zeolite X, zeolite Y, zeolite beta, TS-1, TS-2, ETS-10, ETAS-10, ETGS-10, MCM-22, MCM-36, MCM-41, MCM-48, MCM-49, MCM-50, MCM-56, MCM-65, MCM-71, EMM-10, EMM-10P, ZSM-5, ZSM-11, ZSM-12, ZSM-18, ZSM-22, ZSM-23, ZSM-35, ZSM-39, ZSM-48, ZSM-50, ZSM-57, ZSM-58, Mordenite, Faujasite, zeolite L, ferrierite, SAPO-11, SAPO-17, SAPO-18, SAPO-34, SAPO-44.

Preferably the molecular sieve composition comprises at least one molecular sieve crystal and at least one binder.

Usually the molecular sieve will be combined with binder material resistant to the temperature and other conditions employed in the process. Examples of suitable binder material include clays, alumina, silica, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The molecular sieve may also be composited with zeolitic material such as the zeolitic materials which are disclosed in U.S. Pat. No. 5,993,642, which is hereby incorporated by reference.

Naturally occurring clays that can be composited with the or each molecular sieve as a binder for the catalyst composition include the montmorillonite and kaolin family, which families include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the or each molecular sieve can be composited with a porous matrix binder material, such as an inorganic oxide selected from the group consisting of silica, alumina, zirconia, titania, thoria, beryllia, magnesia, and combinations thereof, such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. It may also be advantageous to provide at least a part of the foregoing porous matrix binder material in colloidal form so as to facilitate extrusion of the catalyst composition.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

The solution for ion-exchange contains a solvent and a solute, wherein the solute comprises at least one of an amide compound, an imide compound, a strong proton donor, or any combination thereof. In one embodiment, the solution is substantially free of ammonium salt. The term ammonium salt as used in this disclosure means a cation/anion pair, wherein the cation is ammonium ion. Examples of ammonium salt are ammonium nitrate, ammonium chloride, and ammonium sulfate. Therefore, amide compounds and/or imide compounds are not ammonium salts. The term "substantially free of ammonium salt" as used herein means the solution having less than 0.1 wt % of ammonium ions based on the total weight of the solution. In another embodiment, the solution for ion-exchange comprises essentially of a solvent and a solute, wherein the solute comprises at least one of an amide compound, an imide compound, a strong proton donor, or any combination thereof. In yet another embodiment, the solution for ion-exchange comprises a solvent and a solute, wherein the solute comprises essentially of an amide compound, an imide compound, a strong proton donor, or any combination thereof.

The solute useful for this disclosure comprises at least one of an amide compound, an imide compound, a strong proton donor, or any combination thereof. The solute has a solubility in the solvent of at least 0.05 g per 100 grams of the solvent, preferably at least 1 g per 100 grams of the solvent, more preferably at least 10 g per 100 grams of the solvent, and even more preferably at least 50 g per 100 grams of the solvent.

In some preferred embodiments, the solvent comprises at least one of water, alcohol, or DMSO.

Preferably, the strong proton donor comprises at least one of nitric acid, hydrochloric acid, sulfuric acid, acetic acid, oxalic acid, or carbonic acid.

Preferably, the amide compound comprises at least one of carbamide, alkyl carbamate, carbamic acid, or cyanamide. More preferably, the amide compound comprises urea, ammonium carbamate, and ammonium formate.

In some aspect of this disclosure, the ion-exchange conditions have a temperature ranging from 0° C. to less than 100° C., a pressure ranging from 10 kPa-a to 1000 kPa-a, a pH ranging from about 0 to 14, and a molar ratio of cation exchange capacity of the molecular sieve composition over cation per charge of the solute range from 0.005 to 200.

In some embodiments, the catalyst useful for this disclosure is made by a process comprising the steps of:
 (1) calcining a molecular sieve in air, $N_2$, or mixture thereof,
 (2) ion-exchanging the calcined molecular sieve;
 (3) extruding the ion-exchanged molecular sieve to form extrudates; and
 (4) calcining the extrudates in air, $N_2$, or mixture thereof.

In other embodiments, the catalyst useful for this disclosure is made by a process comprising the steps of:
 (1) ion-exchanging a molecular sieve;
 (2) calcining the ion-exchanged molecular sieve with air, $N_2$, or mixture thereof,
 (3) extruding the calcined molecular sieve to form extrudates; and
 (4) calcining the extrudates in air, $N_2$, or mixture thereof.

In some embodiments, the catalyst useful for this disclosure is made by a process comprising the steps of:
 (1) ion-exchanging a molecular sieve;
 (2) extruding the ion-exchanged molecular sieve to form extrudates; and
 (3) calcining the extrudates from step (2) with air, $N_2$, or mixture thereof.

In yet other embodiments, the catalyst useful for this disclosure is made by a process comprising the steps of:
 (1) extruding a molecular sieve to form extrudates;
 (2) ion-exchanging the extrudates; and
 (3) calcining the ion-exchanged extrudates in air, $N_2$, or mixture thereof.

In yet other embodiments, the catalyst useful for this disclosure is made by a process comprising the steps of:
(1) extruding a molecular sieve to form extrudates;
(2) calcining the extrudates in air, $N_2$, or mixture thereof;
(3) ion-exchanging the extrudates; and
(4) calcining the ion-exchanged extrudates in air, $N_2$, or mixture thereof.

In one aspect, the calcination step(s) is performed at a temperature ramping rate of 0.1 to 100° C./min to a temperature greater than 300° C. In other aspects, the molecular sieve composition is formed into extrudates by extruding a molecular sieve crystal with a binder.

All patents, patent applications, test procedures (such as ASTM methods), priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for manufacturing a catalyst composition comprising:
   (a) extruding at least one molecular sieve with at least one binder to form an extrudate;
   (b) calcining said extrudate with $N_2$ and/or air at a temperature ranging from 20° C. to 700° C.;
   (c) contacting said calcined extrudate from step (b) with an ion exchange solution comprised of a solvent and a solute under ion-exchange conditions to form an exchanged extrudate, wherein said ion-exchange solution is free of salt, ammonium ion, or acid, wherein said solute comprises at least one of an amide compound, an imide compound, or any combination thereof, said solute has a solubility in said solvent of at least 0.05 g per 100 grams of said solvent, wherein said amide compound comprises urea;
   (d) separating said exchanged extrudate from said ion-exchange the step (c); and
   (e) contacting said exchanged extrudate with $N_2$ and/or air at a temperature ranging from 20° C. to 700° C. to form said catalyst composition.

2. The process of claim 1, wherein said molecular sieve has a Constraint Index of less than or equal to 12.

3. The process of claim 1, wherein said molecular sieve composition comprises at least one of zeolite X, zeolite Y, zeolite beta, TS-1, TS-2, ETS-10, ETAS-10, ETGS-10, MCM-22, MCM-36, MCM-41, MCM-48, MCM-49, MCM-50, MCM-56, MCM-65, MCM-71, EMM-10, EMM-10P, ZSM-5, ZSM-11, ZSM-12, ZSM-18, ZSM-22, ZSM-23, ZSM-35, ZSM-39, ZSM-48, ZSM-50, ZSM-57, ZSM-58, Mordenite, Faujasite, zeolite L, Ferrierite, SAPO-11, SAPO-17, SAPO-18, SAPO-34 or SAPO-44.

4. The process of claim 1, wherein said solvent comprises at least one of water, alcohol, or DMSO.

5. The process of claim 1, wherein said solution has a solute concentration of at least 1 gram solute per 100 grams of said solvent.

6. The process of claim 1, wherein said ion-exchange conditions have a temperature ranging from 0° C. to 100° C., a pressure ranging from 10 kPa-a to 1000 kPa-a, a pH ranging from about 0 to 14, and a molar ratio of cation exchange capacity of said molecular sieve composition over cation per charge of said solute range from 0.005 to 200.

7. The process of claim 1, further comprising step of calcining said molecular sieve composition in $N_2$ and/or air at a temperature greater than 300° C. prior to said step (a).

8. A process for hydrocarbon conversion comprising the steps of:
   (a) contacting a hydrocarbon with a catalyst composition produced by the process of claim 1 under hydrocarbon conversion conditions to form a converted product; and
   (b) withdrawing said converted product.

* * * * *